Jan. 19, 1971  T. G. BROWN  3,555,888
ULTRASONIC DETECTION APPARATUS

Filed April 15, 1968  4 Sheets-Sheet 1

INVENTOR
THOMAS GRAHAM BROWN
By Young & Thompson
ATTYS

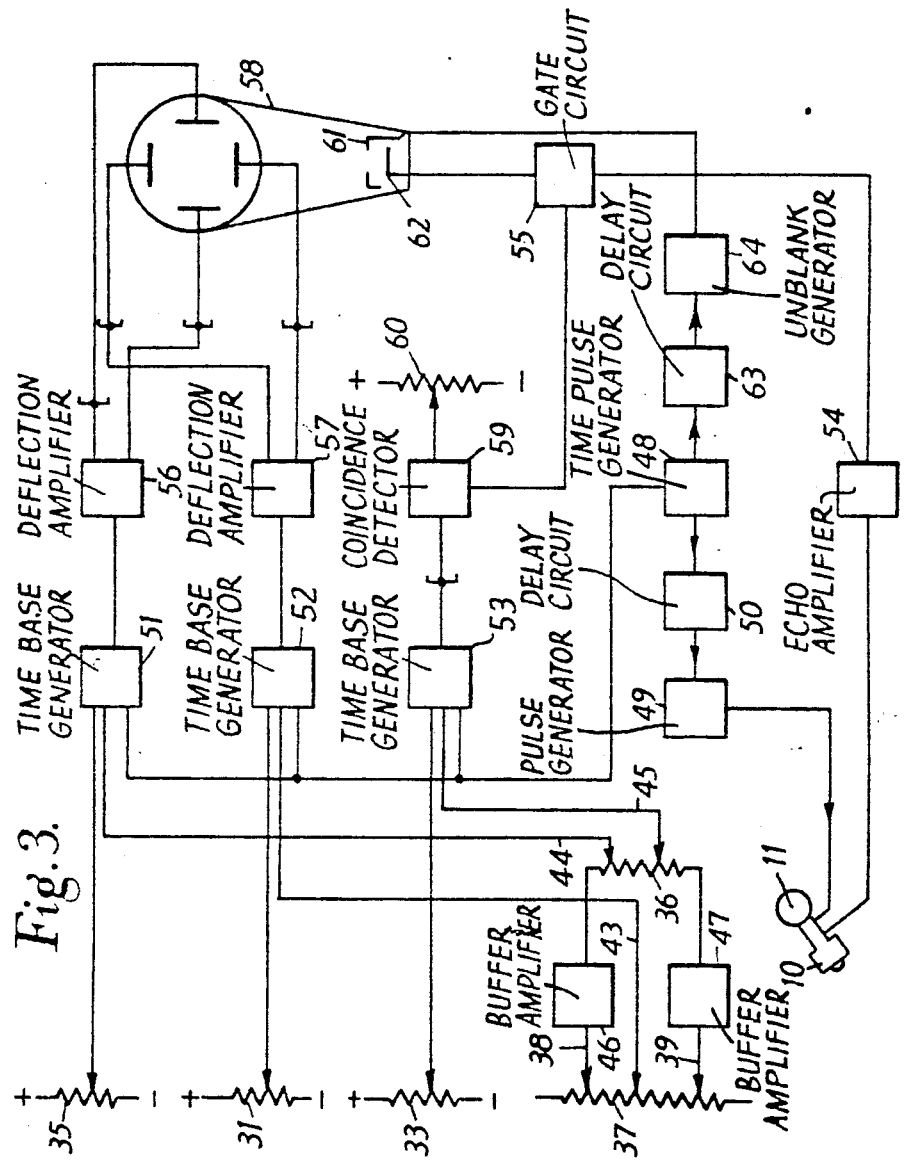

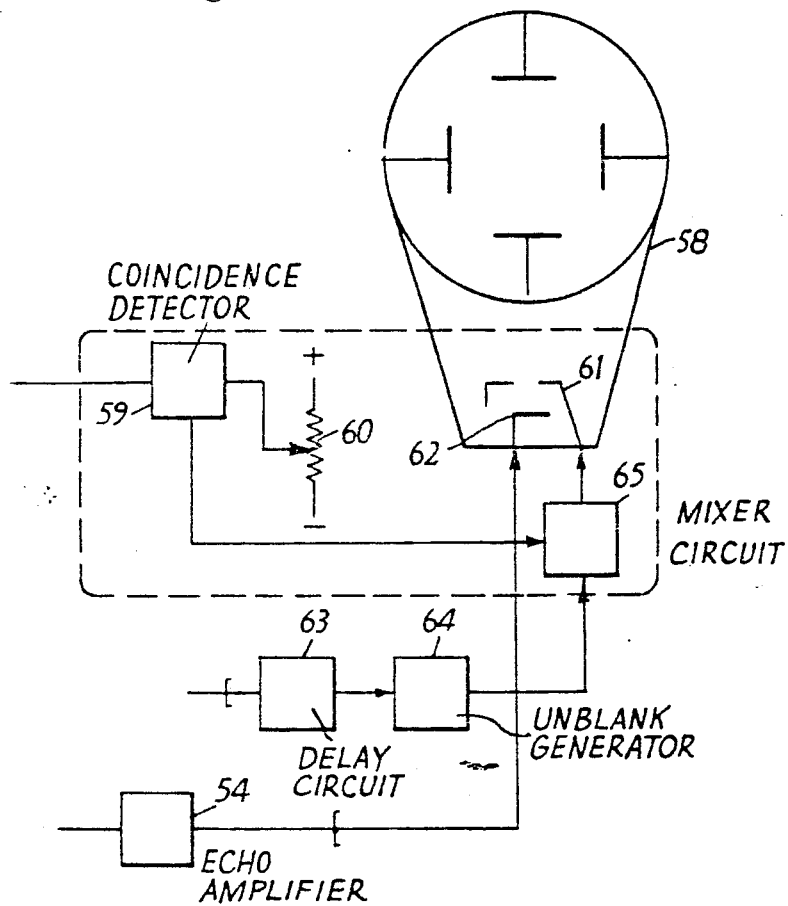

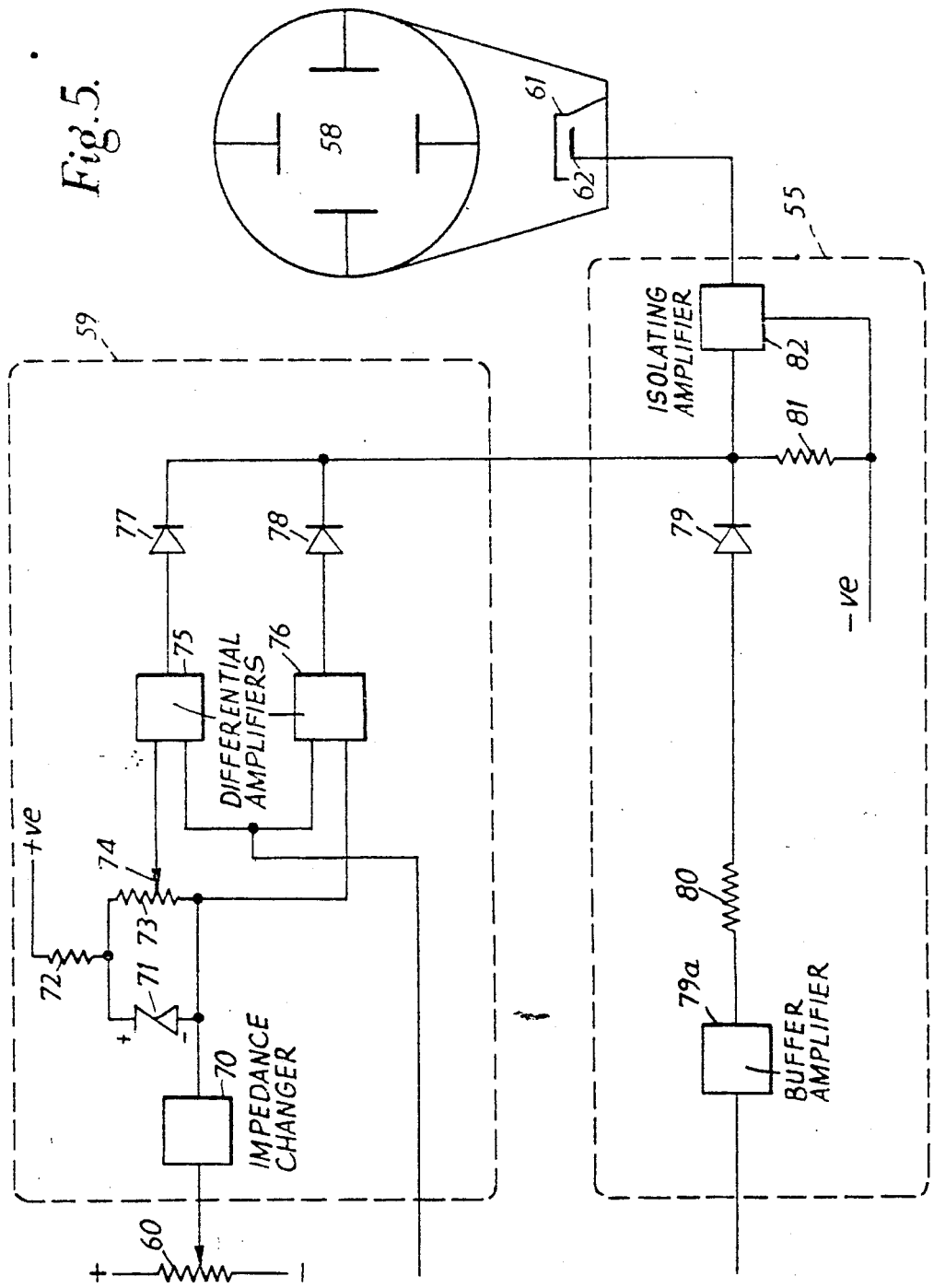

United States Patent Office 3,555,888
Patented Jan. 19, 1971

3,555,888
ULTRASONIC DETECTION APPARATUS
Thomas Graham Brown, The Bungalow, Bankhead Farm,
Aberdour, Scotland
Filed Apr. 15, 1968, Ser. No. 726,274
Claims priority, application Great Britain, Apr. 14, 1967,
17,304/67
Int. Cl. G01n 29/00
U.S. Cl. 73—67.8                    5 Claims

ABSTRACT OF THE DISCLOSURE

An ultrasonic detection apparatus, particularly for medical diagnostic purposes has a transducer system located within a probe which can undergo three coordinate translational movements and two rotatory movements. Means are provided for resolving these movements into components along the three axes to control time base circuits for displaying echoes from tissue interfaces on a cathode ray tube or tubes and to control a selecting means by which echoes are selected for display from a particular plane section of hte body under examination.

---

Figure 1:
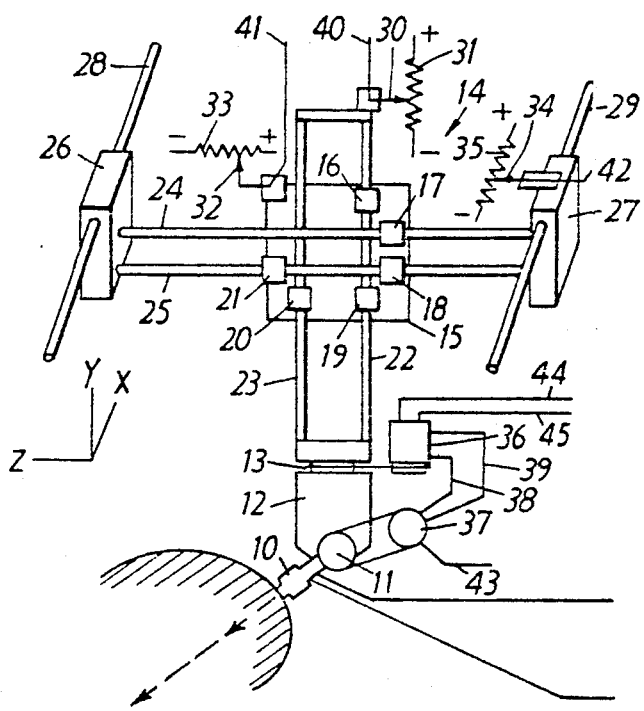

The present invention relates to apparatus for the ultrasonic examination of bodies having a non-planar surface and while it has particular application to medical diagnosis, it is not limited thereto and may equally have application to industrial examination.

Much research and development work has been done in the ultrasonic examination of human bodies as a diagnostic acid in medicine using ultrasonic pulses and a number of different types of apparatus are available for this purpose. Many of the apparatus so far developed have the common feature that ultrasonic pulses are transmitted into the body at different points in a plane, hereinafter referred to as the examination plane, and pulses reflected from a tissue interface are displayed on an indicator usually a cathode ray tube screen, the time base of which is synchronised with the transmission of the pulse and whose time base velocity is half that of the assumed mean velocity of sound in soft tissue.

Usually, the ultrasonic transducer system, consisting of separate transducers for transmission and reception or a single transducer serving both functions, is included within a probe which is traversed in one plane over the surface of the body. The probe is attached to the apparatus by a mechanical linkage provided with potentiometer arrangements which provide electrical signals representing the instantaneous position in the examination plane of the probe in, for example, Cartesian coordinates and representing the inclination within such plane of the probe, for example, as the resolved components of the group velocity of the ultrasonic pulses along the cartesian coordinate axes. These electrical voltages are used to control the generation of a corresponding resultant time base for the cathode ray tube display. One of the difficulties in the use of such apparatus is that a reflected pulse will generally only be received and displayed if the transmitted pulse is incident substantially perpendicularly on the tissue interface.

Apparatus has already been proposed in United States specification No. 3,086,390 which partially meets this difficulty, the apparatus using a method of scanning known as compound sector scanning. According to this, it is arranged that at each of a number of positions around the surface of the body being examined, the probe is given a rocking action in the examination plane. It will, of course, be understood that the rocking frequency will be very much less than the pulse repetition frequency of the ultrasonic transmitter and, therefore, the probability of detecting a tissue interface is increased, particularly if observations are made in a number of closely spaced longitudinal or transverse planes.

It has also been proposed to employ three dimensional scanning in which the probe is allowed movementt in three dimensions, so that the pulses may, within the mechanical limitations of the apparatus, be directed into the body at any angle. The mechanical linkage between the probe and the apparatus will again provide electrical signals for the generation of the time base of the cathode ray tube but in this case there will be additional signals to take care of the third dimension. A possible display system for use with three dimensional scanning would be to use the signals defining the position and inclination of the probe in the examination plane (hereinafter referred to as the X and Y signals) to conrtol the generation of the time base for the cathode ray tube and to use the additional signals (hereinafter referred to as the Z signals) for modulating the anode/cathode potential of an electrostatic deflection tube without post deflection acceleration. Since the deflection sensitivity of such a tube is inversely proportional to the anode/cathode potential, the size of the cross-sectional representations will be different due to the continuous variation of the Z signals to give a perspective effect. Alternatively, by including coordinate transformation arrangements, it is possible to mix the X, Y and Z signals to that the representation is rotated slightly. Two such representations rotated slightly in opposite directions and applied to the two cathode ray tubes will give a stereoscopic pair of displays. An observer with suitable optical viewing apparatus or with the necessary aptitude for visually combining the two images would gain a three-dimensional representation of the tissue interface examined.

The object of the present invention is to use three-dimensional scanning of the body and to provide a display arrangement which enables an easier interpretation of the echo information.

According to the present invention, in apparatus for the ultrasonic examination of bodies employing an ultrasonic transducer system included within a probe which is traversed relative to the body under examination and which directs a beam of ultrasonic pulses into the body, the reflected pulses being displayed on the screen or screens of one or more cathode ray tubes, control means are provided which cause the direction of propagation of the beam of ultrasonic pulses to be varied to give a three-dimensional scan of the body under examination and selecting means are provided which enable the display on the screen of a cathode ray tube of echo signals arising from reflection only at a particular internal plane section of the body under examination.

Figure 2:
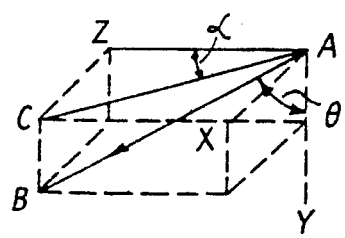

The invention will be better understood from the following description of the invention which should be read in conjunction with the accompanying drawings comprising FIGS. 1 to 5. In the drawings:

FIG. 1 shows diagrammatically position conversion equipment which resolves the movement of the probe into components along three coordinate axes, FIG. 2 is a vector diagram for explaining the operation of the position conversion equipment, FIG. 3 shows a block schematic form of the electronic equipment for controlling the display of the echoes on the screen of a cathode ray tube, FIG. 4 shows an alternative arrangement to that shown in FIG. 3 for applying control signals to the cathode ray tube and FIG. 5 shows the detailed circuits of part of the electronic equipment shown in FIG. 3.

Referring first to FIG. 1, this shows one form of mechanical linkage for enabling the probe to perform a three-dimensional scan, the mechanical linkage including resolvers to enable control potentials representative of the instantaneous position of the probe to be obtained.

The probe 10 is mounted for rotatory movement about the axis 11 in a block 12 which is itself mounted for rotatory movement about a vertical axis by the provision of a rotating joint 13, the axis of the rotating joint 13 intersecting the axis 11 perpendicularly. The probe is also capable of translational movement in three coordinate axes X, Y and Z. In the drawing it is assumed that the X axis is perpendicular to the plane of the drawing, that the Y-axis is vertical and parallel to the plane of the drawing and the Z-axis is perpendicular to the Y-axis and is also parallel to the plane of the drawing. In order to obtain a true display on the screen of the cathode ray tube the time base generating circuits for the tube must be controlled in accordance with the translational movement of the probe and also in accordance with the rotational or angular movement of the probe, and the way in which this is done will now be described, the equipment used being that indicated generally at 14 in FIG. 1, and being generally referred to as position conversion equipment.

The equipment 14 consists of a back plate 15 provided with six bushes 16, 17, 18, 19, 20 and 21. Guide rod 22 slides in the bushes 16 and 19 and guide rod 23 slides through bush 20, the guide rods 22 and 23 carrying at their lower ends the rotating joint 13. Guide rod 24 slides in the bush 17 and guide rod 25 slides in the bushes 18 and 21. The guide rods 24 and 25 terminate in blocks 26 and 27 which slide along the guide rods 28 and 29 respectively. Movement parallel to the Y-axis is effected by raising or lowering the guide rods 22 and 23; movement parallel to the Z-axis is effected by moving the back plate 15 to right or left along the guide rods 24 and 25 and movement parallel to the X-axis is effected by moving the blocks 26 and 27 backwards and forwards along the guide rods 28 and 29. A slider 30 of a potentiometer 31 is driven by movement parallel to the Y-axis; a slider 32 of a potentiometer 33 is driven by movement parallel to the Z-axis and a slider 34 of a potentiometer 35 is driven by movement parallel to the X-axis. Rotation of the joint 13 is measured by a sine/cosine potentiometer 36 and rotation of the probe about the axis 11 is measured by a sine/cosine potentiometer 37. The outputs from the potentiometers 31, 33 and 35 are taken by leads 40, 41 and 42 respectively to the control equipment, the circuit diagram for which is shown in FIG. 3 and will be described in detail later. The sine/cosine potentiometer 37 has three outputs one of which is taken by lead 43 to the control equipment shown in FIG. 3 and the other two are taken by leads 38 and 39 to the sine/cosine potentiometer 36. The output of potentiometer 36 is taken by leads 44 and 45 to the control equipment.

It will be seen therefore that the instantaneous position of the intersection of the axis of the rotating joint with the axis 11 is given by the outputs of the three translation potentiometers whereas the angular position of the probe with respect to the joint 13 and the axis 11 is given by the setting of the two sine/cosine potentiometers. Suppose the probe axis makes an angle $\theta$ with the axis of the sliding joint 13 as shown by the vector AB in FIG. 2. The two sine/cosine potentiometers 36 and 37 are interconnected electrically so as to perform a coordinate transformation whereby the vector AB is resolved into components along the X, Y and Z axes. For this purpose, potentiometer 37 has three outputs, one of which, on lead 43, will be cos $\theta$ and this will be proportional to the component along the Y axis. Two further outputs are taken from potentiometer 37, namely sin $\theta$ and $-\sin \theta$ on leads 38 and 39 respectively and provide the D.C. source for potentiometer 36 as shown in FIG. 3. The connections between the two potentiometers each include a buffer amplifier 46 and 47 having near unity gain, the amplifiers serving to provide a low-impedance drive to potentiometer 36 and to prevent the introduction of errors by the variation due to rotation of the output impedance of potentiometer 37.

Now since the outputs of potentiometer 37 are proportional to the vector AC in FIG. 2 and if the position of the joint 13 makes an angle $\alpha$ with respect to the Z-axis, the outputs of the potentiometer 36, which will be sin $\theta$, sin $\alpha$ and sin $\theta$.cos$\alpha$ will be proportional to the components in the X- and Z-axes respectively of the rotational movement of the probe. If now the translational X and Y components, $x$ and $y$, are combined with the rotational X and Y components sin $\theta$ sin $\alpha$ and cos $\theta$, in the time base circuits, sawtooth waveforms will be generated but the datum voltage at which the waveforms commence will vary with the variation in the positional components applied thereto. The time base generating circuits may be similar to those described in United States specification No. 3,086,390 or may be of any other type known in the art.

If, for the sake of simplicity, a scale factor of unity is assumed for the cathode ray tube display, then a cross-section parallel to the XY plane at a position $z'$ along the Z axis would be displayed by feeding the X and Y deflection circuits of the cathode ray tube with the signals $$x + \frac{V \sin \theta . \sin \alpha . t}{2}$$

and $$y + \frac{V \cos \theta . t}{2}$$

respectively where $t$ is the elapsed time from the instant of transmission of the pulse, V is the group velocity of propagation of the ultrasonic pulses and the factor of ½ is introduced to take care of the go-and-return time of the pulse and echo.

If all the echo information is now fed to modulate the beam of the cathode ray tube, a time exposure photograph of the cathode ray tube screen would consist of the superimposition of all the echo-signals received during the three-dimensional scan. However, if a gate circuit is introduced into the modulating circuit and the gate circuit is controlled to open only when a signal is applied thereto representative of a particular value of Z, then the echoes displayed on the screen will be those arising from a cross section parallel to the XY plane at a position along the Z axis given by the particular value of Z. Due to the limitations of practical gate circuits, and the need to ensure adequate brightness of the cathode ray tube display, it is impractical to display echoes from an infinitely thin cross-sectional region. Therefore the gate circuit is arranged to select echo signals derived from a layer of the body of thickness $\delta z$, the boundaries of which lie parallel to the XY plane at positions along the Z-axis given by the particular values of Z, and Z+$\delta z$., where $\delta z$ is small in relation to the dimensions of the body and is typically between one half and ten wavelengths of the ultrasound employed. The gate circuit is therefore a selecting means for selecting for display the echoes derived from a particular cross section by three-dimensional scanning.

Referring now to FIG. 3 the operation of the apparatus is controlled by a timing pulse generator 48 which delivers regularly spaced pulses to the pulse generator 49 through a fixed delay circuit 50 compensating for the distance between the transducer pivot axis 11 and the transducer face. Pulses are delivered by the pulse generator 49 at a rate within the range of 25 to 2,000 pulses per second. The pulses from the pulse generator are also applied directly to the three time base generators 51, 52 and 53. The output from the pulse generator 49 is fed to the transducer in the probe 10 and a succession of ultrasonic pulses are transmitted into the body, these pulses having a nominal centre frequency with the range of 1 to 15 mc./s. and a duration of 2 to 5 cycles. The return echoes are fed to an amplifier and processing circuit 54, the output of which is applied to the gate circuit 55.

As previously explained cross sections in X–Y planes are being examined by the probe. The output from the time base generator 51 will be of the form $$x + \frac{V \sin \theta \cdot \sin \alpha.t}{2}$$

where $x$ is the X coordinate of the instantaneous position of the probe. Similarly the output of time base generator 52 will be of the form $$y + \frac{V \cos \theta.t}{2}$$

The outputs of time base generators 51 and 52 are applied to X and Y deflection amplifiers 56 and 57 respectively, the outputs of which are applied to the deflection plates of the cathode ray tube 58.

With regard to the time base generator 53, this is also arranged to provide an output of the form $$z + \frac{V \sin \theta \cdot \cos \alpha.t}{2}$$

which is applied to a coincidence detector 59. An adjustable voltage representative of the particular cross-section required in terms of the Z coordinate, say $z'$ is also applied to the coincidence detector by potentiometer 60. An output will be obtained from the coincidence detector 59 only when the input $$z + \frac{V \sin \theta \cdot \cos \alpha.t}{2}$$

falls between the limits $z$ and $z' + \delta z$. The output from the coincidence detector opens the electronic switch or gate circuit 55 and only the echoes arising from the particular cross-section defined by the Z coordinates $z'$ and $z' + \delta z$ will be applied to the cathode ray tube. The adjustable voltage applied to the coincidence detector and obtained from the adjustable potentiometer 60 enables any particular cross-section to be selected.

It will of course, be understood that each pulse transmitted into the body under examination and the return echo will occur within one operative cycle of the time base generators and if the echo arises from a cross-section defined by $z'$ and $\delta z'$ a single spot will appear on the screen.

It is to be understood that the X, Y and Z axes are to be regarded as fixed relative to the body being examined and examination may be desirable in cross-sections in the XZ and YZ planes instead of the XY plane. Thus if examination is required over an XZ cross-section, the output of time base generator 51 will still be applied to the X deflection amplifier but the output of time base generator 52 will be applied to the coincidence detector 59 and the output of time base generator 53 will be applied to the Y deflection amplifier. A similar rearrangement will occur for cross-sections in the YZ planes. A simple switching arrangement (not shown) between the time base generators and the amplifiers and coincidence detector would enable such rearrangement to be effected.

In some cases it may be desirable to observe simultaneously a number of different cross-sections. A cathode ray tube would then have to be provided for each cross-section together with an associated electronic switch and coincidence detector. The commoning marks on the drawing denote this. The potentiometers associated with the coincidence detectors would be set to give different voltages in accordance with the selected cross-sections and the different cross-sections may be observed. Such multiple cross-sections would be in parallel planes, but if non-parallel multiple cross-sections were required, this could be achieved by providing additional deflection amplifiers connected to the appropriate outputs of time base generators 51, 52 and 53 whereby cross-sections parallel to the XY, XZ or YZ planes could be observed simultaneously.

In addition to enabling examination to be made along cross-sections in planes parallel to the XY, YZ and XZ planes it is also possible, by the use of coordinate transformation circuits between the time base generators and the deflection amplifiers and coincidence circuit to examine cross-sections in planes parallel to a skew plane or to sample simultaneously cross-sections in, for example, the XY and YZ planes and in skew planes.

It is normal practice to render the cathode ray tube inoperative between operating cycles of the equipment by means of a bias voltage applied to either the grid or modulator 61 or the cathode 62. The arrangements for supplying its bias and other supplies to the cathode ray tube are not shown in detail in FIG. 3. A signal is taken from timing pulse generator 48, and delayed by a suitable time by delay circuit 63, before triggering unblanking pulse generator 64 the output of which is connected to the modulation system of the cathode ray tube. The delay circuit 63 may be set so that the unblanking pulse generated by generator 64 renders the cathode ray tube operative from approximately the instant of transmission of a sound pulse until immediately before the end of the time base wave form, or such earlier time as may be desired.

In FIG. 3 the unblanking pulse is shown to be applied to grid or modulator 61 of the cathode ray tube, while the echo signals which have passed through gate unit 55 are applied to the cathode 62. It will be understood that provided that the polarity of the echo signals and the unblanking pulse are correctly arranged, it is immaterial whether the signals are applied in this manner, or in the reverse manner.

An alternative to the arrangement shown in FIG. 3 is that illustrated in FIG. 4. In this embodiment, the echo signals from the echo amplifier 54 are applied directly to the cathode 62. The output from the coincidence detector 59 is added to the unblanking pulse from the unblank generator 64 in mixer circuit 65. The bias levels on the grid or modulator 61 and cathode 62 are so chosen that the cathode ray tube is only responsive to echo signals during periods when the output from the coincidence detector and the unblanking pulse are present simultaneously. This arrangement has the disadvantage that the output of the coincidence detector may be a continuous signal if the probe 10 is being scanned within the selected plane, and thus direct coupling from the coincidence detector to the modulation system 61 and 62 is implied, with consequent complication of the display system. A preferred embodiment of the invention is generally as described in relation to FIG. 3 and as described in detail in FIG. 5.

A description will now be given with reference to FIG. 5 of the coincidence detector 59 and the gate circuit 55. Potentiometer 60 provides a voltage $Vz'$ corresponding to $z'$, representing the Z coordinate of the cross-section to be displayed. This voltage is applied to a buffer impedance changing stage 70, which may be for example an emitter-follower. The output of 70 is connected to the negative terminal of a constant voltage device 71 which may for example be a Zener diode associated with a resistor 72 connected to a source of positive voltage in excess of the maximum positive voltage which can be provided by potentiometer 60.

A potentiometer 73, which has a high resistance in relation to resistor 72 is connected in parallel with the Zener diode 71. Thus the slider 74 can pick off a voltage which can be adjusted from $Vz'$ to some other more positive value $Vz' + \delta V$. The voltage $\delta V$ defines the thickness of the layer of the body from which echoes are derived for display on the cathode ray tube 58. High-gain differential amplifiers 75 and 76 having high common-mode rejection, and output limiting arrangements, such as are commonly known as voltage comparators are included in the circuit. Each amplifier is arranged to give a negative output voltage of, for example, six volts, relative to a datum, whenever the voltage on one of its two input terminals, the inverting input terminal, is more positive than that on the other, the non-inverting terminal by a small amount, for example, 0.05 volt.

The inverting input terminal of amplifier 75 is connected to $Vz'+\delta v$ on slider 74 and the non-inverting terminal of amplifier 76 is connected to $Vz'$ at the output of impedance changer 70. The non-inverting terminal of amplifier 75 and the inverting terminal of amplifier 76 are connected together and to the output of time base generator 53 in FIG. 3. The outputs of the two amplifiers 75 and 76 are connected to the anodes of diodes 77 and 78 respectively. The cathodes of these diodes are connected together and to the cathode of diode 79. Rectified echo signals from amplifier 54 in FIG. 3 are connected to a buffer amplifier 79a from which they emerge as negative-going pulses relative to the same datum as the outputs of amplifier 75 and 76, limited by a limiting device such as a Zener diode contained in amplifier 54 or buffer amplifier 79a to a value approximately the same as the output voltage swing of amplifiers 75 and 76. These echo signals are fed through a small limiting resistor 80 to the anode of diode 79. The cathode of diode 79 is connected to one end of resistor 81 and to the output of an isolating and amplifying circuit 82. The other end of resistor 81 is connected to a source of voltage equal to the maximum negative excursion of the outputs of amplifiers 75, and 76. The neutral input terminal of isolating amplifier 82 is also connected to the voltage source. Diodes 77, 78 and 79 and resistor 81 form an "and" gate. Diode 79 will be unable to conduct echo signals unless the outputs of both amplifier 75 and 76 are negative.

The output of amplifier 75 will be negative only when the voltage input from time base circuit 53 (FIG. 3) is more negative than $Vz'+\delta z'$ and the output of amplifier 76 will be negative only when the voltage input from time base circuit 53 is more positive than $Vz'$. Thus only those echo signals which occur whilst the output of time base generator 53 is between $Vz'$ and $Vz'+\delta z'$ will appear on the cathode ray tube display.

I claim:
1. In combination in apparatus for the ultrasonic examination of bodies, a probe, an ultrasonic transducer system included within said probe, a pulse generator for applying energising pulses to said transducer system to enable a beam of ultrasonic pulses to be directed towards the body under examination, at least one cathode ray tube for displaying echo signals derived from reflected pulses, a mounting for said probe allowing the probe to undergo translational movement relative to three co-ordinate axes and to undergo two rotatory movements, the axis of one rotatory movement being parallel to a first of said co-ordinate axes whereas the axis of the second rotatory movement is perpendicular to and intersects the axis of the first rotatory movement, means for resolving said translational movements and said rotatory movements into components along each of said three co-ordinate axes, means responsive to the resolved components along said first and a second of said three co-ordinate axes for deriving control potentials for controlling movement of the beam of the cathode ray tube, selecting means, means responsive to the resolved component along the third of said three co-ordinate axes for deriving a further control potential dependent on said resolved component along said third co-ordinate axis, means applying said further control potential to said selecting means for comparison therein with a fixed potential and means responsive to a predetermined relationship between said further control potential and said fixed potential for enabling echo signals to be displayed on said cathode ray tube whereby the echo signals displayed arise from reflection only at a particular internal plane section of the body under examination.

2. The combination as claimed in claim 1 and including means for comparing said further control potential with two limiting values of said fixed potential whereby a display appears on the screen of said cathode ray tube if said control potential falls between said two limiting values.

3. The combination as claimed in claim 1 and including means for adjusting said fixed potential to enable the plane section of examination to be altered.

4. Apparatus according to claim 2 and including first and second differential amplifiers in said selecting means, each amplifier having an inverting and non-inverting input, a potentiometer, first and second tapping points on said potentiometer, means connecting said first tapping point representative of the upper of said limiting values to the inverting input of said first amplifier, means connecting said second tapping point representative of the lower of said limiting values to the non-inverting input of said second amplifier and means applying said further control potential to the non-inverting input of said first amplifier and the inverting input of said second amplifier.

5. Apparatus according to claim 4 and including a modulating system for the cathode ray tube, an AND gate, means connecting the output of said first amplifier to one input of said AND gate, means connecting the output of said second amplifier to a second input of said AND gate, means connecting the echo signals to a third input of said AND gate and means connecting the output of said gate circuit to said modulating system.

References Cited

UNITED STATES PATENTS

| | | | |
|---|---|---|---|
| 3,086,390 | 4/1963 | Brown | 73—67.8 |
| 3,310,049 | 3/1967 | Clynes | 73—67.8 |
| 3,406,564 | 10/1968 | Phillips | 73—67.8 |
| 3,439,530 | 4/1969 | Flaherty | 73—67.8 |

RICHARD C. QUEISSER, Primary Examiner

ARTHUR E. KORKOSZ, Assistant Examiner

U.S. Cl. X.R.

73—71.5